United States Patent
Ligi, Jr. et al.

(10) Patent No.: US 10,336,263 B2
(45) Date of Patent: Jul. 2, 2019

(54) SUN VISOR ASSEMBLY WITH ELECTRONIC DEVICE RECEIVER

(71) Applicant: FORD GLOBAL TECHNOLOGIES, LLC, Dearborn, MI (US)

(72) Inventors: Anthony Ligi, Jr., Chelsea, MI (US); Scott Holmes Dunham, Redford, MI (US); Nicholas Dornik, Canton, MI (US); Rosaria Lee Petrella-Lovasik, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/808,772

(22) Filed: Nov. 9, 2017

(65) Prior Publication Data

US 2019/0135194 A1    May 9, 2019

(51) Int. Cl.
| | |
|---|---|
| *B60J 3/02* | (2006.01) |
| *B60R 11/02* | (2006.01) |
| *B60R 16/037* | (2006.01) |
| *H02J 7/00* | (2006.01) |
| *B60R 11/00* | (2006.01) |
| *H02J 7/02* | (2016.01) |

(52) U.S. Cl.
CPC ......... *B60R 11/0241* (2013.01); *B60J 3/0204* (2013.01); *B60R 16/037* (2013.01); *B60R 2011/0035* (2013.01); *B60R 2011/0071* (2013.01); *B60R 2011/0294* (2013.01); *H02J 7/0045* (2013.01); *H02J 7/025* (2013.01)

(58) Field of Classification Search
CPC .. B60J 3/0204; B60R 7/05; B60R 2011/0294; B60R 2011/0071; H02J 7/025; B60N 3/105; B60N 2/793; B60N 3/101; B60N 3/102

USPC ........................................................ 296/97.5
See application file for complete search history.

(56) References Cited

U.S. PATENT DOCUMENTS

| | | | | |
|---|---|---|---|---|
| 4,870,676 A | * | 9/1989 | Lewo | .................. B60R 11/0241 |
| | | | | 455/564 |
| 7,032,949 B1 | * | 4/2006 | Wang | ..................... B60J 3/0239 |
| | | | | 296/97.5 |
| 8,666,464 B2 | | 3/2014 | Frye et al. | |
| 8,668,123 B2 | | 3/2014 | Richmond | |
| 9,393,914 B2 | | 7/2016 | Doan et al. | |
| 9,487,150 B2 | | 11/2016 | Cha | |
| 9,630,569 B2 | | 4/2017 | Richard | |

(Continued)

FOREIGN PATENT DOCUMENTS

| | | |
|---|---|---|
| DE | 102011115348 A1 | 5/2012 |
| FR | 2758112 B1 | 2/1999 |
| KR | 101761851 B1 | 7/2017 |

OTHER PUBLICATIONS

English Machine Translation of DE102011115348A1.
English Machine Translation of FR2758112A1.
English Machine Translation of KR101761851B1.

*Primary Examiner* — Pinel E Romain
(74) *Attorney, Agent, or Firm* — Vichit Chea; King & Schickli, PLLC

(57) ABSTRACT

A sun visor assembly includes a visor body and an electronic device receiver carried on the visor body. The electronic device receiver includes a clamping feature having a slider and an opposed latching feature. The visor body may also include a USB feature and/or a viewing port extending through the visor body.

20 Claims, 9 Drawing Sheets

(56) References Cited

U.S. PATENT DOCUMENTS 9,712,741 B2 7/2017 Kothari
2017/0240028 A1* 8/2017 Still ........................ B60Q 3/80

* cited by examiner

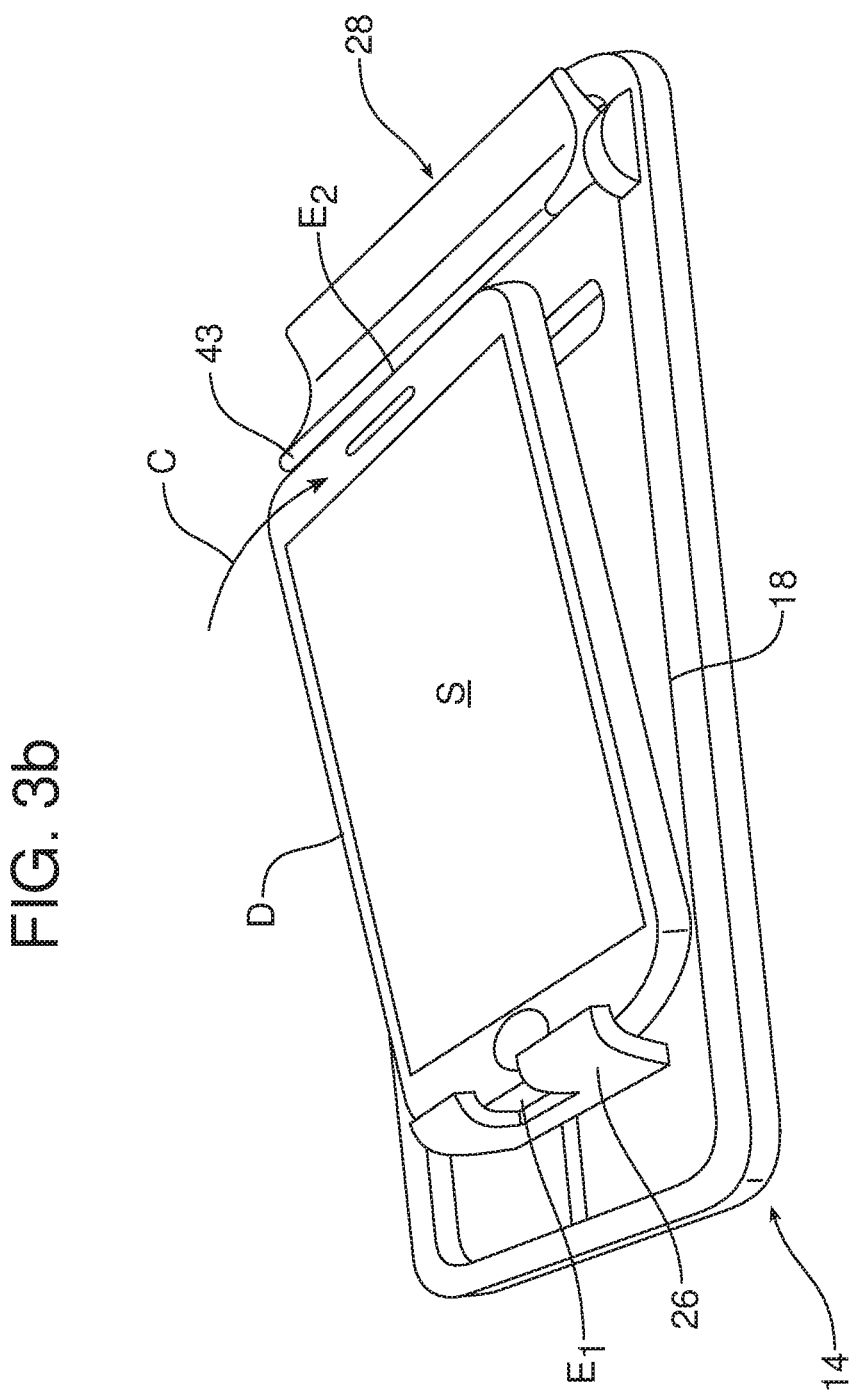

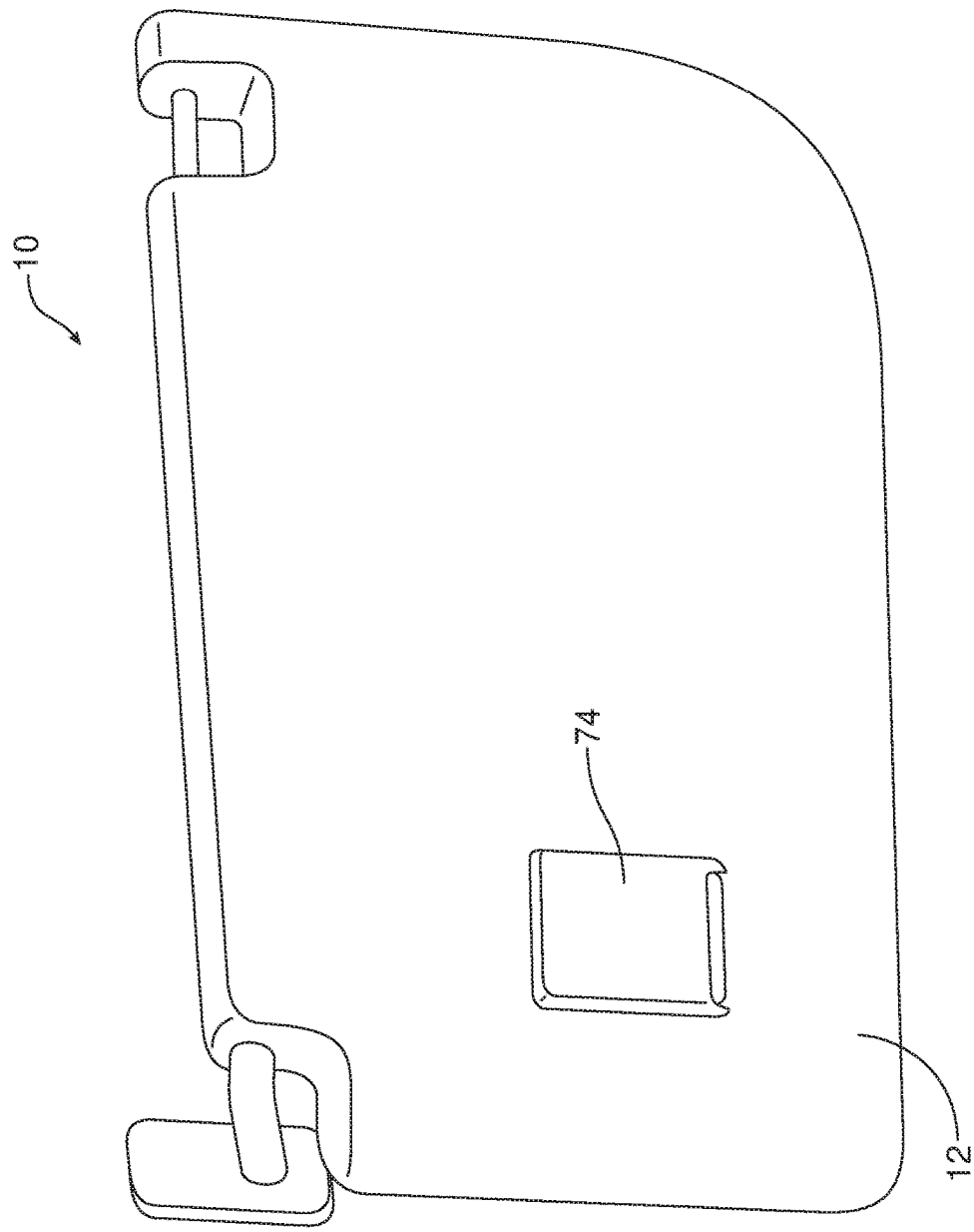

SUN VISOR ASSEMBLY WITH ELECTRONIC DEVICE RECEIVER

TECHNICAL FIELD

This document relates generally to the motor vehicle equipment field and, more particularly, to a new and improved sun visor assembly incorporating an electronic device receiver that allows for charging and hard-wired connectivity.

BACKGROUND

This document relates to a new and improved sun visor assembly which incorporates an electronic device receiver that provides for hard-wired connectivity between the electronic device and the motor vehicle as well as for charging of the electronic device. The electronic device is also securely held in position in the electronic device receiver on the visor body where it is securely maintained even when subjected to foreseeable acceleration, deceleration and cornering forces experienced during operation of the motor vehicle. Advantageously, the sun visor assembly provides for convenient storage of an electronic device at an easily accessible but otherwise out of the way location.

When the electronic device is used for navigation, the positioning of the screen of the electronic device on the visor body makes it easier to view and approaches the convenience of a heads-up display (HUD) and is therefore ergonomically friendly. Advantageously, the sun visor assembly may also incorporate a viewing port allowing the electronic device to capture video in a vehicle forward direction thereby allowing the electronic device to function as a dash-camera. Thus, it should be appreciated that the sun visor assembly with the integrated electronic device receiver provides a number of benefits and advantages and represents a significant advance in the art.

SUMMARY

In accordance with the purposes and benefits described herein, a new and improved sun visor assembly is provided. That sun visor assembly comprises a visor body and an electronic device receiver carried on the visor body. The electronic device receiver includes a clamping feature having a slider in order to hold the electronic device in a secure manner even when subjected to foreseeable forces encountered during operation of the motor vehicle in which the sun visor assembly is provided.

The electronic device receiver may include a latching feature. Further, a biasing element may be provided to bias the slider toward the latching feature and thereby positively retain the electronic device in the electronic device receiver by being squeezed between the slider and the latching feature.

The electronic device receiver may also include a cradle embedded in the visor body. The latching feature may be pivotally mounted to the cradle by a first pivot feature. Further, the latching feature may include a channel and the first pivot feature may define a pivot axis parallel to the channel.

Still further, the visor assembly may include a viewing port extending through the visor body. More specifically, the viewing port may include a displaceable cover allowing one to open or close the viewing port.

The viewing port may have a first end in communication with the electronic device receiver. Further, the viewing port may include a guideway and the displaceable cover may slide along that guideway between a first position closing a second end of the viewing port and a second position opening the second end of the viewing port.

The sun visor assembly may also include a USB feature carried on the visor body. The USB feature may include a base fixed to the body, a hub connected to the base by a pivot and a USB port carried on the hub.

In accordance with an additional aspect, a sun visor assembly comprises a visor body and a USB feature carried on the visor body. The USB feature may include a base fixed to the visor body, a hub connected to the base by a pivot and a USB port carried on the hub.

The sun visor assembly may further include a viewing port extending through the visor body. The viewing port may include a cover displaceable between a first position closing the viewing port and a second position opening the viewing port. The viewing port may include a guideway and the cover may slide along that guideway.

In accordance with yet another aspect, a sun visor assembly comprises a visor body and a viewing port extending through the visor body. The viewing port includes a cover displaceable between a first position closing the viewing port and a second position opening the viewing port. The viewing port may further include a guideway and the cover may slide along that guideway.

In any of the embodiments, the sun visor assembly may further include a wireless charging feature carried on the visor body for charging an electronic device held in the electronic device receiver.

In the following description, there are shown and described several preferred embodiments of sun visor assembly. As it should be realized, the sun visor assembly is capable of other, different embodiments and its several details are capable of modification in various, obvious aspects all without departing from the sun visor assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the sun visor assembly.

FIGS. 3a-3c are a series of views illustrating how one secures an electronic device in the electronic device receiver.

FIGS. 5a and 5b are detailed perspective views of the rear face of the sun visor assembly illustrating, respectively, the displaceable cover of the viewing port in the closed position and the opened position.

Reference will now be made in detail to the present preferred embodiments of the sun visor assembly examples of which are illustrated in the accompanying drawing figures.

DETAILED DESCRIPTION

Figure 1:
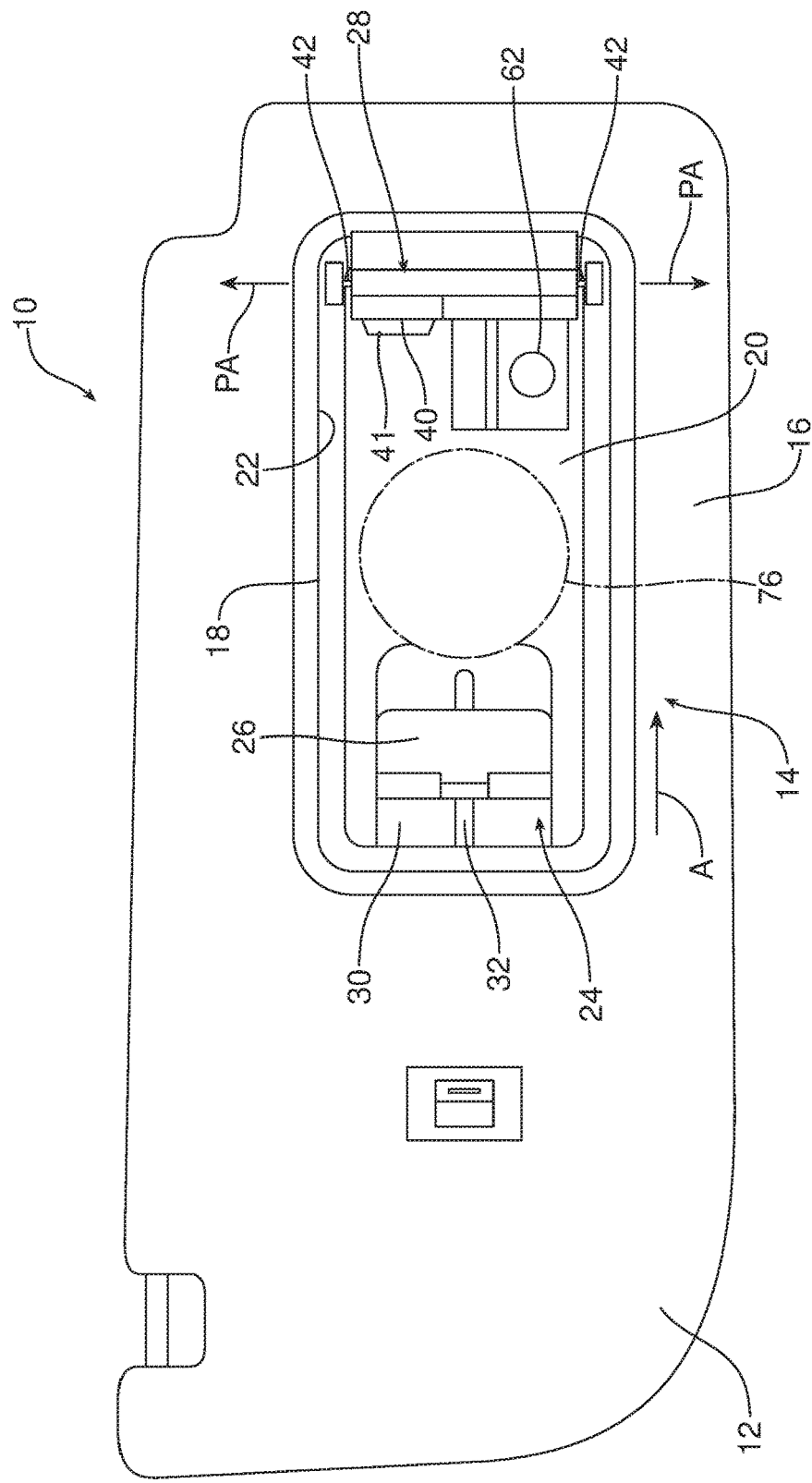
FIG. 1 is a front plan view of the sun visor assembly illustrating the electronic device receiver and the USB feature carried on the visor body.

Reference is now made to FIGS. 1, 2, 3a-3c, 4a, 4b, 5a and 5c which illustrate a new and improved sun visor assembly 10. As best illustrated in FIG. 1, the sun visor assembly 10 includes an electronic device receiver 14 carried on a first face 16 of the visor body 12.

More specifically, the electronic device receiver 14 includes a cradle 18 that is embedded in the visor body 12. As will become apparent from the following description, the cradle 18 comprises a recess 20 defined within a surrounding sidewall 22.

The electronic device receiver 14 includes a clamping feature 24 for positively and securely holding an electronic device D in the recess 20 of the cradle 18 in a manner described in detail below. That clamping feature 24 includes a slider 26 and a cooperating latching feature 28. More specifically, in the illustrated embodiment, the cradle 18 includes a recessed guide track 30 and a guide slot 32. The slider 26 includes a guide post 34 that extends through the slot 32.

Figure 2:
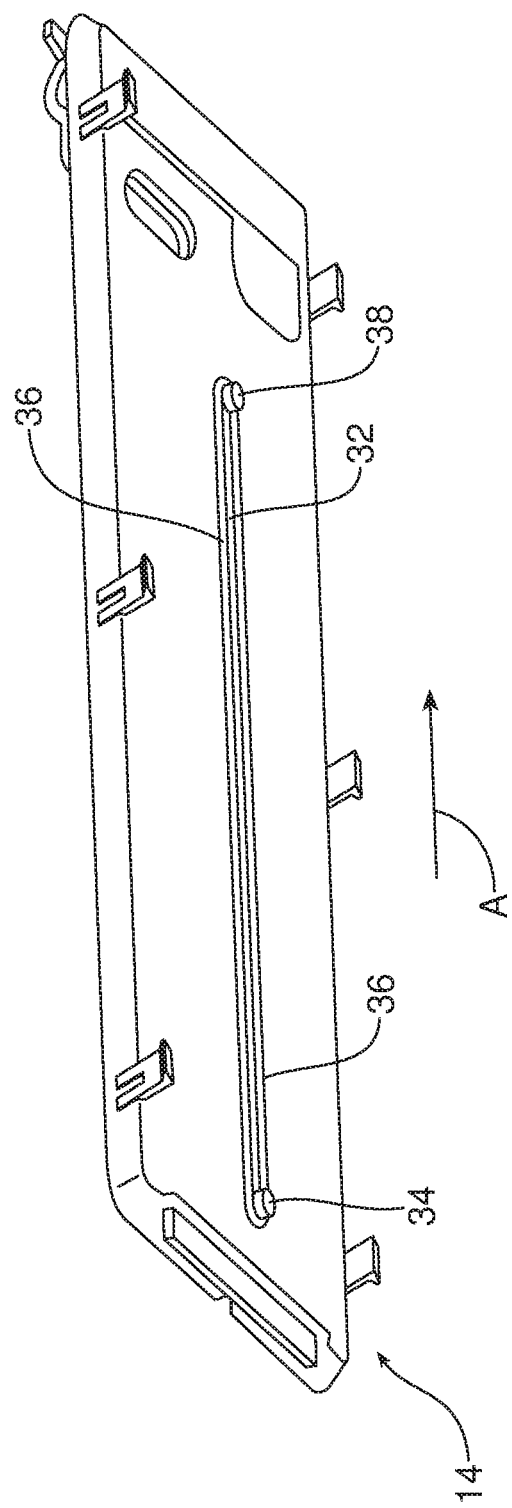
FIG. 2 is a perspective view of the rear of the electronic device receiver illustrating the biasing element that biases the slider of the electronic device receiver toward the latching feature.

A biasing element 36 functions to bias the slider in the direction of action arrow A toward the latching feature 28 (See FIGS. 1 and 2). In the illustrated embodiment, the biasing element 36 comprises an elastic band that is stretched over the rear face of the cradle 18 from the guide post 34 on the slider 26 to a fixed post 38 secured to the cradle 18 (see FIG. 2).

The latching feature 28 includes a channel 40. The latching feature 28 is pivotally mounted to the cradle 18 by a first pivot feature 42. More specifically, the first pivot feature 42 may comprise two pivot pins at longitudinal ends of the latching feature 28 that are received in cooperating receivers in the sidewall 22 of the cradle 18. As should be appreciated, the first pivot feature 42 defines a pivot axis PA that is parallel to the channel 40.

Figure 3A:
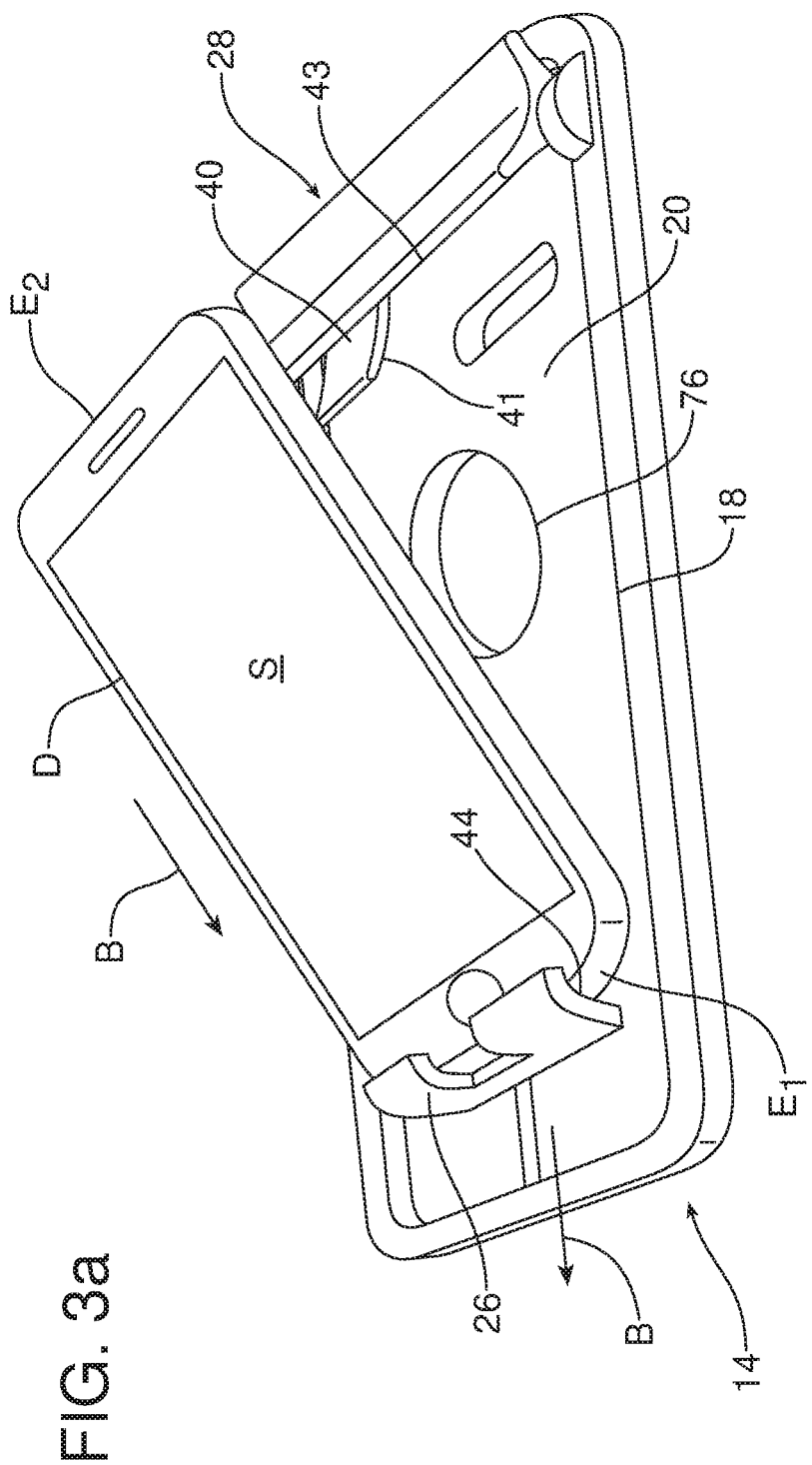
Figure 3C:
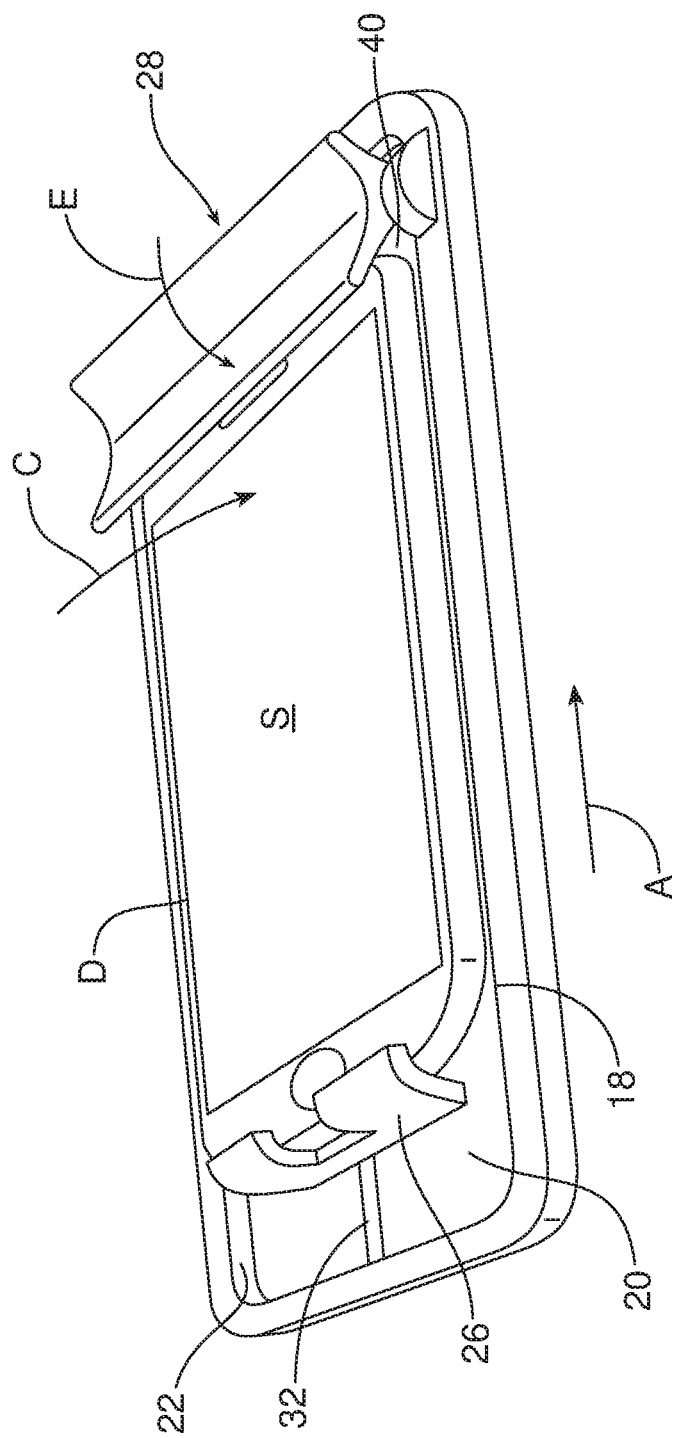

As best illustrated in FIGS. 3a-3c, one may easily secure an electronic device D in the cradle 18 of the electronic device receiver 14. This is done by inserting a first end $E_1$ of the electronic device D into the receiving channel 44 of the slider 26 and then pushing slider 26 in the direction of action arrows B away from the latching feature 28 against the biasing force of the biasing element 36.

Once the second end $E_2$ of the electronic device D clears the latching feature 28, one pushes the second end $E_2$ of the electronic device D into the channel 40, defined between the lower lug 41 and the upper lip 43 of the latching feature 28, and releases pressure against the biasing element 36 (see FIGS. 1, 3a and 3b). Next, as illustrated in FIG. 3c, one pushes the second end $E_2$ of the electronic device D in the direction of action arrow C down into the recess 20 of the cradle 18. This causes the latching feature 28 to pivot (see action arrow E) about the first pivot feature 42/pivot axis PA fully seating the electronic device D within the recess 20 inside the sidewall 22 of the cradle 18. Here it should be appreciated that the biasing element 36 provides a biasing force (see action arrow A) that displaces the slider 26 toward the latching feature 28 so that the slider simultaneously squeezes and holds the electronic device between the slider 26 and the latching feature 28 while also providing an over center type locking action securing the latching feature 28 in the position illustrated in FIG. 3c wherein the channel 40 lies in but is angled just below the plane of the recess 20.

Figure 4A:
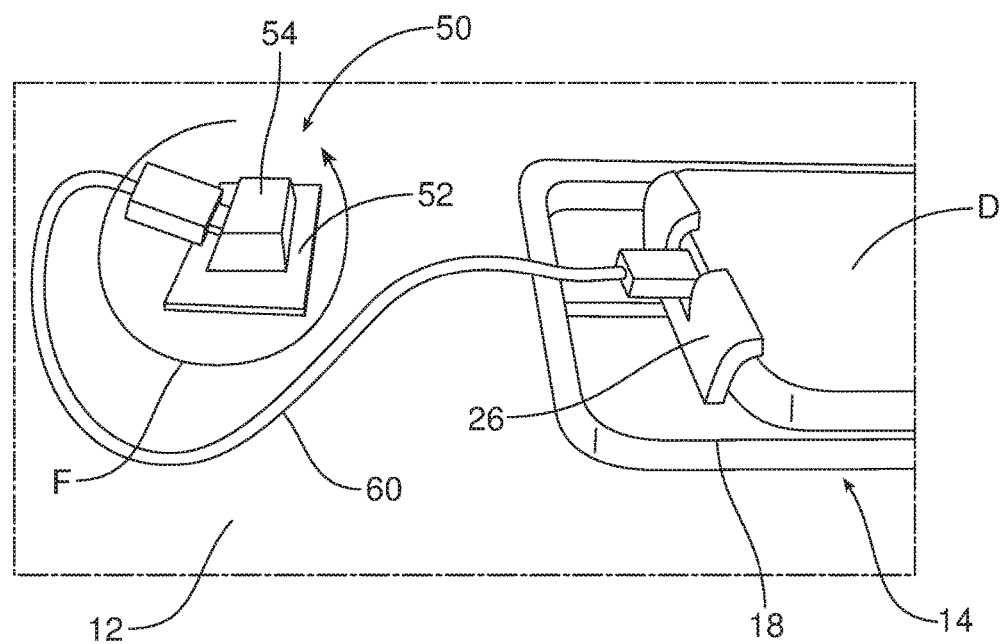
FIGS. 4a and 4b are two detailed views illustrating the functionality of the USB feature.
Figure 4B:
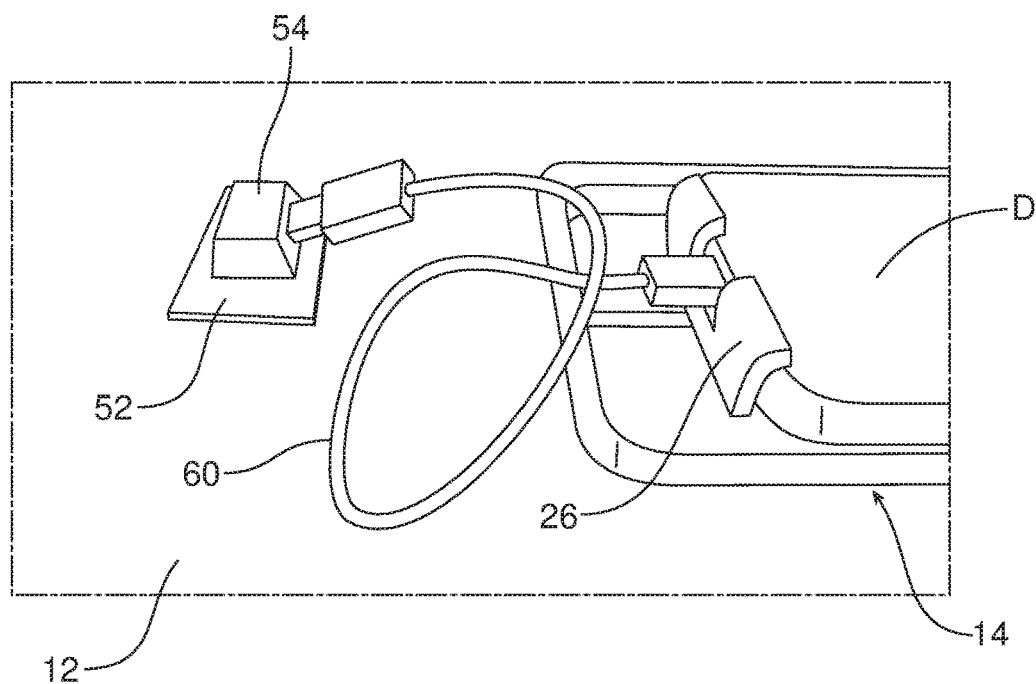
Figure 4C:
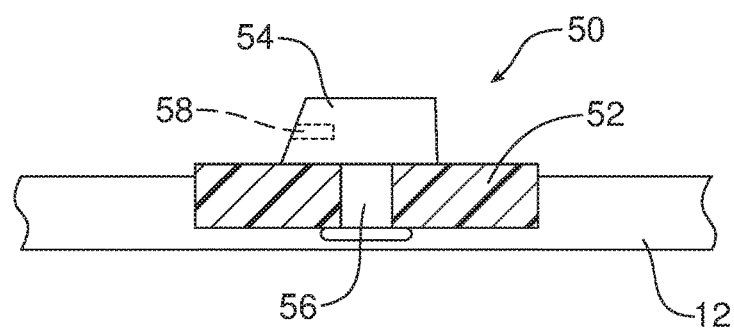
FIG. 4c is a partially cross-sectional view further illustrating the structure of the USB feature also shown in FIGS. 4a and 4b.

As illustrated in FIGS. 4a-4c, the sun visor assembly 10 may also include a USB feature generally designated by reference numeral 50. More specifically, the USB feature 50 of the illustrated embodiment includes a base 52 fixed to the visor body 12, a hub 54 connected to the base by a stub shaft or pivot 56 and a USB port 58 carried on the hub.

In one possible embodiment, the hub 54 has a 360 degree range of motion with respect to the base 52 (note action arrow F in FIG. 4a). Thus, as illustrated in FIG. 4a, the USB port 58 may, for example, be oriented away from the cradle 18 or, as illustrated in FIG. 4b, the USB port may be oriented toward the cradle or even at any position between these two extremes. Significantly, the adjustability of the USB feature 50 allows the USB port 58 to be oriented in the most beneficial position to allow electrical connection with the electronic device D held in the cradle 18 using a short USB cable 60. More specifically, the USB feature 50 may be positioned to allow easy connection while maintaining the USB cable 60 adjacent the face of the visor body 12 where it will not interfere in any way with the operation of the motor vehicle.

Figure 5B:
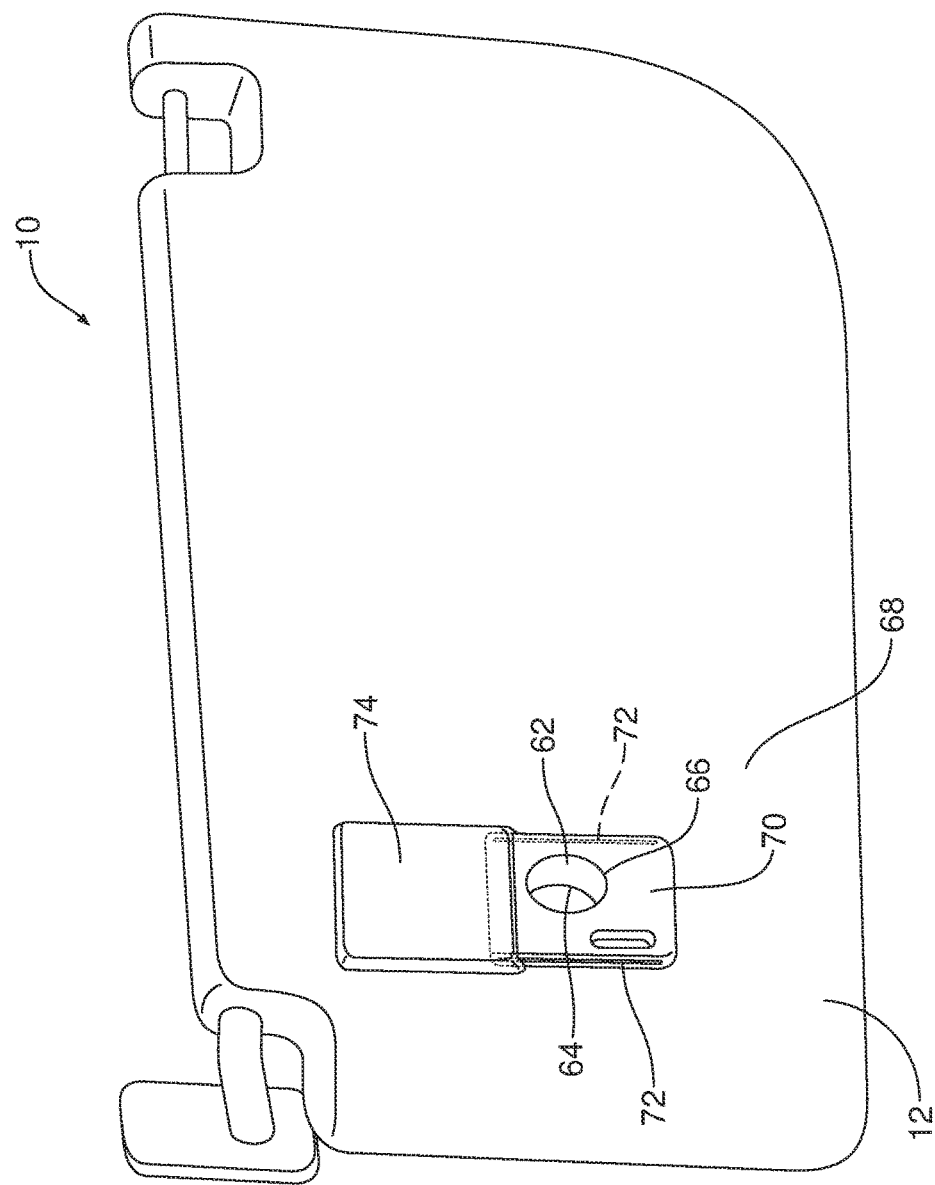

As illustrated in FIGS. 5a and 5b, the sun visor assembly 10 may also include a viewing port 62. As illustrated, the viewing port 62 extends through the visor body 12. More specifically, the viewing port 62 has a first end 64 in communication with the electronic device receiver 14 and, more specifically, the cradle 18, and a second end 66 at the second face 68 of the visor body opposite the first face 16.

As illustrated in FIGS. 5a and 5b, the viewing port 62 is defined in a housing 70 having a guideway 72. A displaceable cover 74 slides along the guideway 72 and may be selectively placed between a first position, illustrated in FIG. 5a, closing the viewing port 62 and a second position, illustrated in FIG. 5b, opening the viewing port. In the illustrated embodiment, the guideway 72 comprises two opposed channels and the cover includes two opposed flanges (not shown) that are received in and slide along those channels.

The viewing port 62 is oriented with respect to the electronic device receiver 14 so as to be aligned with the camera lens (not shown) of the electronic device D when the electronic device is secured in the electronic device receiver 14. Thus, when the viewing port 62 is opened as illustrated in FIG. 5b, the electronic device D may capture video through the viewing port. Thus, it should be appreciated that when the visor body 12 is down and the electronic device D is received in the electronic device receiver 14 with the screen S of the device facing toward the driver and the viewing port 62 facing toward the windshield, the electronic device may be utilized as a dash camera to provide video images through the windshield.

At other times, it may be desired to displace the cover 74 into the closed position illustrated in FIG. 5a. For example, when one lowers the visor body 12 to screen the eyes from sunlight when the sun is low in the sky and no electronic device is held in the cradle 18 covering the first end of the viewing port 62, the cover 74 is closed to prevent sunlight from coming through the viewing port 62 and distracting the driver.

The sun visor assembly 10 may also include a wireless charging feature 76 that may be carried on the cradle 18 behind the recess 20 to allow for inductive charging of the electronic device D when held in the electronic device receiver 14. See FIG. 1.

In summary, numerous benefits and advantages are provided by the sun visor assembly 10. The sun visor assembly 10 provides an easily accessible and convenient location to store an electronic device D within a motor vehicle. Advantageously, an electronic device D held in the electronic device receiver 14 on the sun visor body 12 is simultaneously stored out of the way yet at an easily accessible location. When in use, the screen S on the electronic device D is positioned at an ergonomically friendly location where it may be easily viewed in the manner of a heads-up display with minimal distraction to the sight lines used to operate the motor vehicle.

Advantageously, the electronic device D is positively and securely held in the electronic device receiver 14 by the clamping pressure provided by the biasing element 36 which biases the slider 26 toward the opposed latching feature 28. As a result, the electronic device D is squeezed between the slider 26 and the latching feature 28 and positively held in position within the recess 20 of the cradle 18.

The viewing port 62 advantageously allows the electronic device D held in the electronic device receiver 14 to take forward-facing video through the windshield so that the electronic device may function as a dash camera. The wireless charging feature 76 allows the electronic device D to be charged the entire time that it is held in the electronic device receiver 14. Further, the optional USB feature 50 allows for full connectivity between the electronic device D and the electronics systems of the motor vehicle through hardwired connection.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A sun visor assembly, comprising:
   a visor body; and
   an electronic device receiver carried on said visor body, said electronic device receiver including a latching feature and a clamping feature having a slider.

2. The sun visor assembly of claim 1, further including a biasing element biasing said slider toward said latching feature whereby an electronic device is positively retained in said electronic device receiver by being squeezed between said slider and said latching feature.

3. The sun visor assembly of claim 2, wherein said electronic device receiver includes a cradle embedded in said visor body.

4. The sun visor assembly of claim 3, wherein said latching feature is pivotally mounted to said cradle on a first pivot feature.

5. The sun visor assembly of claim 4, wherein said latching feature includes a channel and said first pivot feature defines a pivot axis parallel to said channel.

6. The sun visor assembly of claim 2, further including a viewing port extending through said visor body.

7. The sun visor assembly of claim 6, wherein said viewing port includes a displaceable cover.

8. The sun visor assembly of claim 7, wherein said viewing port has a first end in communication with said electronic device receiver.

9. The sun visor assembly of claim 8, wherein said viewing port includes a guideway and said displaceable cover slides along said guideway between a first position closing a second end of said viewing port and a second position opening said second end of said viewing port.

10. The sun visor assembly of claim 9, further including a USB feature carried on said visor body.

11. The sun visor assembly of claim 10, wherein said USB feature includes (a) a base fixed to said visor body, (b) a hub connected to said base by a pivot and (c) a USB port carried on said hub.

12. The sun visor assembly of claim 1, further including a USB feature carried on said visor body and a wireless charging feature carried on the visor body for charging an electronic device held in the electronic device receiver.

13. The sun visor assembly of claim 12, wherein said USB feature includes (a) a base fixed to said visor body, (b) a hub connected to said base by a pivot and (c) a USB port carried on said hub.

14. A sun visor assembly, comprising:
   a visor body; and
   a USB feature carried on said visor body, said USB feature including (a) a base fixed to said visor body, (b) a hub connected to said base by a pivot and (c) a USB port carried on said hub.

15. The sun visor assembly of claim 14, further including a viewing port extending through said visor body.

16. The sun visor assembly of claim 15, wherein said viewing port includes a cover displaceable between a first position closing said viewing port and a second position opening said viewing port.

17. The sun visor assembly of claim 16, wherein said viewing port includes a guideway and said cover slides along said guideway.

18. A sun visor assembly, comprising:
   a visor body; and
   a viewing port extending through said visor body, said viewing port including a cover displaceable between a first position closing said viewing port and a second position opening said viewing port.

19. The sun visor assembly of claim 18, wherein said viewing port includes a guideway and said cover slides along said guideway.

20. A sun visor assembly, comprising:
   a visor body;
   an electronic device receiver carried on said visor body, said electronic device receiver including a clamping feature having a slider;
   a USB feature carried on said visor body; and
   a wireless charging feature carried on said visor body for charging an electronic device held in said electronic device receiver.

* * * * *